United States Patent
Gogoi et al.

(10) Patent No.: US 11,184,652 B2
(45) Date of Patent: Nov. 23, 2021

(54) BITRATE AND PIPELINE PRESERVATION FOR CONTENT PRESENTATION

(71) Applicant: OpenTV, Inc., San Francisco, CA (US)

(72) Inventors: Amarendra N. Gogoi, Fremont, CA (US); Sanjay Kumar Gupta, Bangalore (IN); Ravikant Swami, Bangalore (IN)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 16/645,598

(22) PCT Filed: Aug. 14, 2018

(86) PCT No.: PCT/US2018/046723
§ 371 (c)(1),
(2) Date: Mar. 9, 2020

(87) PCT Pub. No.: WO2019/050660
PCT Pub. Date: Mar. 14, 2019

(65) Prior Publication Data
US 2020/0267428 A1 Aug. 20, 2020

(30) Foreign Application Priority Data
Sep. 8, 2017 (IN) .............................. 201741031917

(51) Int. Cl.
*H04N 21/2365* (2011.01)
*H04L 29/06* (2006.01)
*H04N 21/2662* (2011.01)

(52) U.S. Cl.
CPC ..... *H04N 21/23655* (2013.01); *H04L 65/607* (2013.01); *H04N 21/2662* (2013.01)

(58) Field of Classification Search
None
See application file for complete search history.

(56) References Cited

U.S. PATENT DOCUMENTS 8,532,171 B1 *  9/2013  Narayanan ......... H04N 21/2187
                                                  375/240.01
8,887,215 B2 * 11/2014  Fisher ................ H04N 21/6125
                                                  725/93

(Continued)

FOREIGN PATENT DOCUMENTS

CN      111194565      5/2020
EP      1775953        4/2007

(Continued)

OTHER PUBLICATIONS

"International Application Serial No. PCT US2018 046723, International Preliminary Report on Patentability dated Apr. 1, 2020", 4 pages.

(Continued)

*Primary Examiner* — Stefan Gadomski
(74) *Attorney, Agent, or Firm* — Schwegman Lundberg & Woessner, P.A.

(57) ABSTRACT

Systems and methods for optimizing a content change process are provided. In example embodiments, a digital receiver causes playback of a first piece of content. The digital receiver receives a selection of a new piece of content for playback during the playback of the first piece of content. In response to the receiving of the selection, the digital receiver maintains a bitrate used for playback of the first piece of content to initiate playback of the new piece of content.

20 Claims, 5 Drawing Sheets

(56) References Cited

U.S. PATENT DOCUMENTS

| | | | | |
|---|---|---|---|---|
| 2006/0215760 | A1* | 9/2006 | Monaco | H04N 21/8456 375/240.16 |
| 2009/0254657 | A1* | 10/2009 | Melnyk | H04N 21/6583 709/224 |
| 2010/0091888 | A1* | 4/2010 | Nemiroff | H04N 21/4385 375/240.28 |
| 2010/0118697 | A1* | 5/2010 | Shumate | H04N 21/2402 370/230 |
| 2010/0158101 | A1* | 6/2010 | Wu | H04N 21/23439 375/240.01 |
| 2011/0225302 | A1* | 9/2011 | Park | H04L 69/14 709/227 |
| 2011/0296047 | A1* | 12/2011 | Orr | G11B 27/105 709/231 |
| 2011/0296458 | A1* | 12/2011 | Di Mattia | H04N 21/23655 725/36 |
| 2012/0177101 | A1* | 7/2012 | van der Schaar | H04N 19/30 375/240.01 |
| 2013/0097309 | A1* | 4/2013 | Ma | H04L 67/2847 709/224 |
| 2013/0142499 | A1* | 6/2013 | Major | H04N 21/2312 386/341 |
| 2014/0149497 | A1* | 5/2014 | Takagaki | H04N 21/43615 709/203 |
| 2015/0039726 | A1* | 2/2015 | Hoffert | H04N 21/42623 709/219 |
| 2015/0052236 | A1* | 2/2015 | Friedrich | H04L 43/08 709/224 |
| 2015/0172352 | A1* | 6/2015 | Gopalakrishnan | H04L 65/4084 709/219 |
| 2015/0188962 | A1* | 7/2015 | Bulava | H04L 65/80 709/231 |
| 2015/0281303 | A1* | 10/2015 | Yousef | H04N 21/4524 709/219 |
| 2016/0119657 | A1* | 4/2016 | Sun | H04N 21/8456 725/94 |
| 2016/0173954 | A1* | 6/2016 | Speelmans | H04N 21/6125 725/116 |
| 2016/0234504 | A1* | 8/2016 | Good | H04N 19/40 |
| 2017/0064400 | A1* | 3/2017 | Riegel | H04N 21/2743 |
| 2017/0070551 | A1* | 3/2017 | Phillips | H04L 47/781 |
| 2017/0070757 | A1* | 3/2017 | Phillips | H04N 21/64738 |
| 2017/0070758 | A1* | 3/2017 | Phillips | H04N 21/64769 |
| 2017/0085933 | A1* | 3/2017 | Czeck, Jr. | H04N 21/26258 |
| 2017/0188056 | A1* | 6/2017 | Do | H04L 47/25 |
| 2017/0188072 | A1* | 6/2017 | Major | H04N 21/238 |
| 2017/0244924 | A1* | 8/2017 | Shintani | H04N 21/4383 |
| 2018/0063590 | A1* | 3/2018 | Her | H04N 21/8146 |
| 2018/0205778 | A1* | 7/2018 | Forman | H04L 65/608 |
| 2018/0241796 | A1* | 8/2018 | Srinivasan | H04L 65/4084 |
| 2018/0338170 | A1* | 11/2018 | Stokking | H04N 21/2662 |
| 2018/0375915 | A1* | 12/2018 | Sridhar | H04L 65/4084 |
| 2019/0334803 | A1* | 10/2019 | Ickin | H04L 65/4092 |

FOREIGN PATENT DOCUMENTS

| | | |
|---|---|---|
| EP | 3050307 | 8/2016 |
| IN | 202047011998 | 5/2020 |
| TW | 201931861 A | 8/2019 |
| WO | WO-2019050660 A1 | 3/2019 |

OTHER PUBLICATIONS

"European Application Serial No. 18853974.6, Extended European Search Report dated Sep. 29, 2020", 9 pages.

Suman, Kalyan Mandal, "Intelligent Pre-fetching to Reduce Channel Switching Delay in IPTV Systems", Internet Citation, (Jan. 1, 2009), pp. 1-6.

Toshiaki, Ako, "A Novel Multichannel Streaming Scheme to Reduce Channel Switching Delay in Application Layer Multicast", IEEE Systems Journal vol. 5, No. 4, (Dec. 1, 2011), pp. 545-554.

"International Application Serial No. PCT/US2018/046723, International Search Report dated Oct. 22, 18", 2 pgs.

"International Application Serial No. PCT/US2018/046723, Written Opinion dated Oct. 22, 18", 9 pgs.

"European Application Serial No. 18853974.6, Response filed Mar. 25, 2021 to Extended European Search Report dated Sep. 29, 2020", 21 pages.

* cited by examiner

BITRATE AND PIPELINE PRESERVATION FOR CONTENT PRESENTATION

CLAIM OF PRIORITY

This application is a U.S. National Stage filing from PCT Application No. PCT/US2018/046723, filed on Aug. 14, 2018, which claims priority to Indian Application Serial No. 201741031917, filed on Sep. 8, 2017, which are incorporated herein by reference in their entireties.

FIELD

The present disclosure generally relates to machines configured to the technical field of special-purpose machines that optimizes a content change process (e.g., channel change) including computerized variants of such special-purpose machines and improvements to such variants, and to the technologies by which such special-purpose machines become improved compared to other special-purpose machines that facilitate optimizing content changes. In particular, the present disclosure addresses systems and methods for preserving a download bitrate and a content playback pipeline during a content change process.

BACKGROUND

Conventionally, during a switch in content (e.g., caused by a channel change or a selection of a different piece of content), a delay occurs as certain information is obtained before the new piece of content (e.g., program, movie, show) is rendered and displayed. Additionally, for adaptive bitrate streaming content, the content typically starts streaming or download at a low (or lowest) bitrate before slowly increasing in bitrate until an optimum bitrate is achieved. This results in initial video or images being grainy. Furthermore, the delay may be increased by a need to build a content playback pipeline each time a change in content occurs.

BRIEF DESCRIPTION OF DRAWINGS

Various ones of the appended drawings merely illustrate example embodiments of the present invention and cannot be considered as limiting its scope.

DETAILED DESCRIPTION

Figure 1:
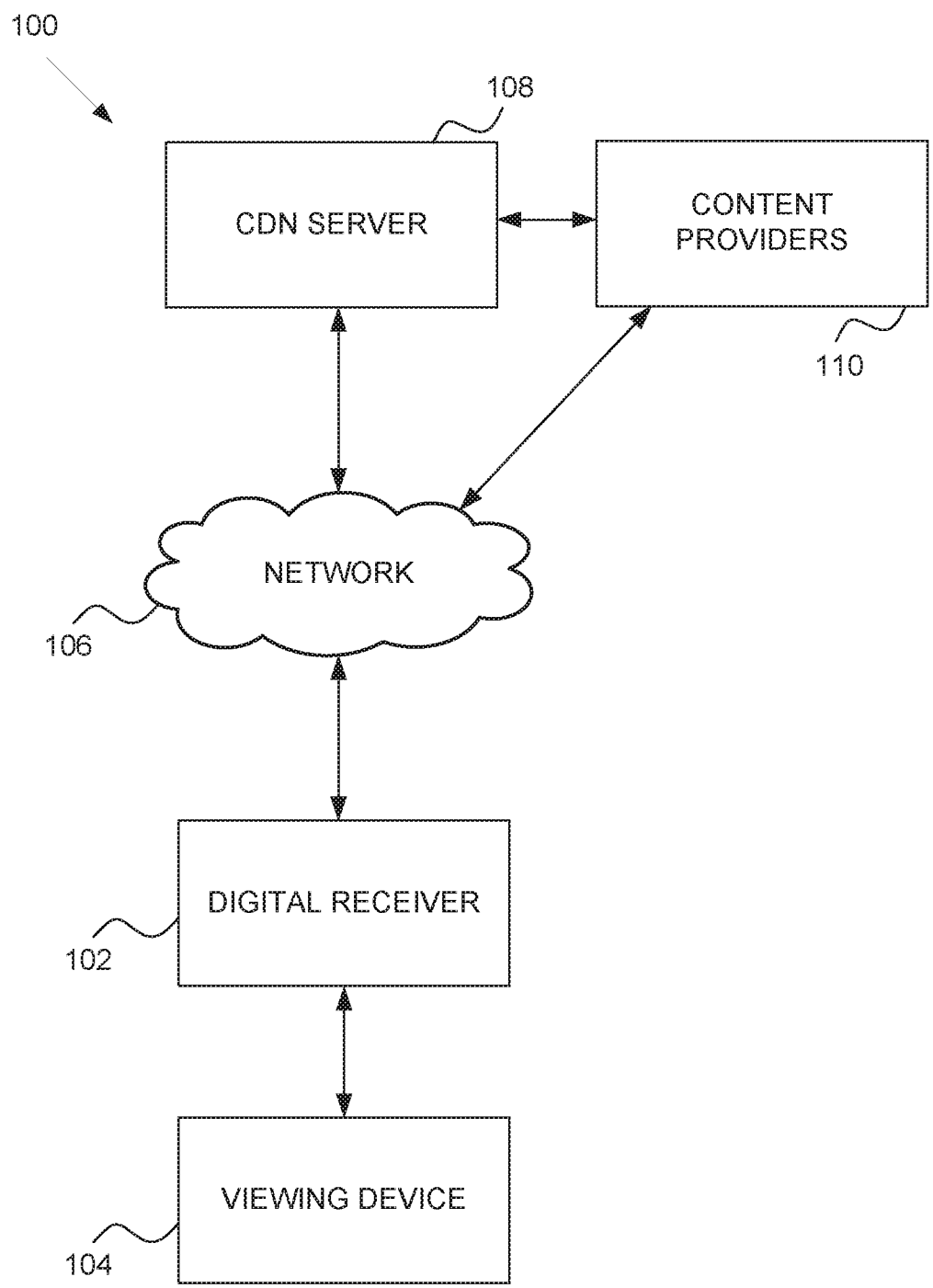
FIG. 1 is a diagram illustrating an example environment for optimizing content changes.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments described herein provide systems and methods for optimizing content changes or switch in content being viewed, such as through a channel change or selection of a different piece of content from a watchlist. In some embodiments, the system uses navigational context (e.g., the way a user is interacting with an application) to identify content of (potential) interest to a viewer. The system then prefetches metadata for the content of interest from a content provider and stores the metadata to local cache. The metadata comprises preconditions for rendering and display of a piece of content that include a minimum set of data that a system can obtain without having to decrypt the content. The prefetched metadata may be used, in example embodiments, to determine whether to preserve at least a portion of a content playback pipeline (also referred to herein as a "content deliver pipeline" or simply a "pipeline").

Conventionally, a same piece of content is broken up into segments (e.g., 10 second segments) and each segment is available in various bitrates. A low bitrate may be grainy, while a high bitrate will normally have better image quality. Typically, when playback of a new piece of content starts, the system does not know the quality of the network bandwidth. As a result, in order to start playback as quickly as possible, conventional systems start with a lowest bitrate. Thus, every time a user switches from one content to the next content, the playback will start with the lowest bitrate and slowly increase or improve according the capability of the network. In contrast, example embodiments, preserve a previous bitrate when switching to a new piece of content. That is, when a user selects a new piece of content to playback (e.g., switching from a previous piece of content to the new piece of content), example embodiments maintain or preserve a (heuristically determined) bitrate used for streaming or downloading the previous piece of content when initiating the playback of the new piece of content. This allows for starting playback as quickly as possible while also providing better image quality from the start.

Furthermore, in conventional systems, a switch or transition in content typically causes a previous content delivery pipeline to be deconstructed (e.g., resources previous acquired are released). Subsequently, a new pipeline is created for the new piece of content (e.g., new resources are acquired). In contrast, example embodiments may maintain or preserve a portion (or an entire) content delivery pipeline (e.g., comprising a source element, a demultiplexer ("demux"), a video decoder, and an audio decoder) used to obtain the previous piece of content instead of reconstructing a pipeline (e.g., destroying the content delivery pipeline and building a new content delivery pipeline). The preservation of the pipeline also allows for playback of the new content as quickly as possible.

As a result, one or more of the methodologies described herein facilitate solving the technical problem of optimizing content change (e.g., reducing time for a change in channel or loading of new content) regardless of the delivery channel—whether the content is broadcast (e.g., IPTV and multicast) or over-the-top (OTT). The methodologies include causing playback, by a digital receiver, of a first piece of content and receiving a selection of a new piece of content for playback during the playback of the first piece of content. In response to the receiving of the selection, the digital receiver maintains a bitrate used for playback of the first piece of content to initiate playback of the new piece of content. The methodologies further include determining whether to preserve at least a portion of a playback pipeline when switching to playback of the new piece of content. In some embodiments, preservation of at least a portion of the playback pipeline comprises determining whether to retrain an audio decoder and a video decoder of the pipeline when switching to playback of the new piece of content. Accordingly, one or more of the methodologies discussed herein improves upon latency during content changes while maintaining image quality. It is noted that content changes include a selection of a piece of content for viewing (e.g., from a content access page such as a favorites grid or via a programming guide) as well as channel changes (e.g., linear channels changes).

With reference to FIG. 1, an embodiment of an example environment 100 that enables optimizing content changes (e.g., reducing latency during channel changes or selection of a piece of content for viewing) is shown. In example embodiments, a digital receiver 102 of a user provides access to digital content and manages content change operations. In one embodiment, the digital receiver 102 is a set-top box. The digital receiver 102 is coupled to a viewing device 104 (e.g., a television or monitor) on which the user can view the digital content. In some embodiments, the digital receiver 102 (e.g., operations of the digital receiver 102) may be combined with the viewing device 104 (e.g., a smart television, a tablet, or smartphone). The components of the digital receiver 102 used to perform operations of example embodiments will be discussed in more detail in connection with FIG. 2 below.

In some embodiments, the digital receiver 102 accesses (e.g., pulls, receives, retrieves) content via a network 106 from a content distribution network (CDN) server 108. The CDN server 108 may obtain the content from one or more content providers 110 (e.g., servers of the content providers 110). In example embodiments, the CDN server 108 may be associated with a third party service (e.g., Netflix, Hulu, YouTube, Amazon,) that stores and provides content, such as, for example but not limited to, over-the-top (OTT) content, video-on-demand (VOD) content, Internet content, or broadcast content to the digital receiver 102 via the network 106. The content comprises text, images, audio, and/or video content (e.g., movies, television shows, videos), and in some embodiments comprise live (e.g., in real-time) content. In some embodiments, the content providers 110 provide content, over the network 106 directly to the digital receiver 102 for display on the viewing device 104.

One or more portions of the network 106 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, a satellite network, a cable network, a broadcast network, another type of network, or a combination of two or more such networks. Any one or more portions of the network 106 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

It is noted that the environment 100 shown in FIG. 1 is merely an example. For instance, any number of CDN servers 108 and content providers 110 may be embodied within the environment 100. Additionally, some components of the environment 100 may be combined. For example, the functions of the digital receiver 102 may be embodied within the viewing device 104 to form a single device, such as a smart television, tablet, smartphone, or any other device that is capable of obtaining, rendering, and displaying content. Moreover, the functions described herein for any single system or machine may be subdivided among multiple systems or machines.

Any of the systems or machines (e.g., databases, devices, servers) shown in, or associated with, FIG. 1 may be, include, or otherwise be implemented in a special-purpose (e.g., specialized or otherwise non-genetic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 5, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 2:
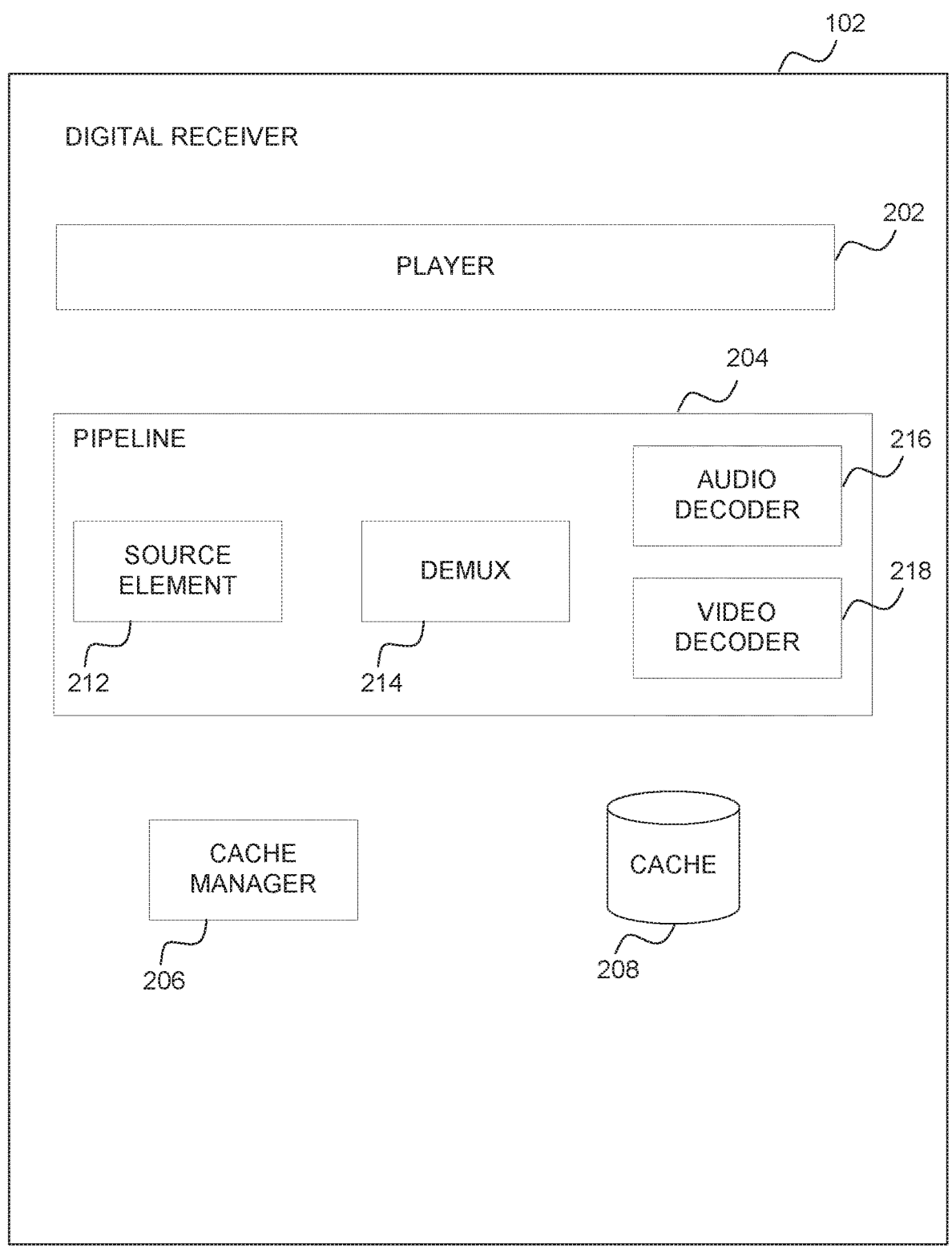
FIG. 2 is a block diagram illustrating an example embodiment of components within a digital receiver in accordance with an example embodiment.

FIG. 2 is a block diagram illustrating an example embodiment of components within the digital receiver 102 in accordance with an example embodiment. In example embodiments, the digital receiver 102 manages access to content streamed over the network 106. In particular, the digital receiver 102 prefetches metadata, preserves a bitrate used for playback (e.g., streaming or downloading) of a previous piece of content when initiating the playback of a new piece of content, and preserves at least a portion of a content delivery pipeline. To enable these operations, the digital receiver 102 comprises a player 202, a content delivery pipeline 204 (also referred to as "pipeline"), a cache manager 206, and a cache 208, all of which may be configured to communicate with each other (e.g., over a bus, shared memory, or a switch). The digital receiver 102 comprises other components (not shown) that are not pertinent to operations of example embodiments.

The player 202 is configured to manage the pipeline 204. In example embodiments, the player 204 instantiates (e.g., constructs) the pipeline 204 when a first piece of content is selected for display. A different pipeline may be constructed for each type of content. For example, the player 202 constructs a HTTP Live Streaming (HLS) pipeline for HLS content and constructs a Dynamic Adaptive Streaming over HTTP (DASH) pipeline for DASH content. The player 204 also decides whether to maintain at least a portion of the pipeline 204 or construct a new pipeline when a switch in content occurs (e.g., channel change or selection of new content for viewing). An example method for managing the preservation of the pipeline is discussed in further detail in connection with FIG. 4 below.

The pipeline 204 is constructed by the player 202 by acquiring appropriate resources for obtaining and processing content data in order to playback selected content. The resources of the pipeline 204 comprise a source element 212, a demultiplexer ("demux") 214, an audio decoder 216, and a video decoder 218. The source element 212 manages the downloading of content data for the selected piece of content. The source element 212 also manages bitrate adaptation at the digital receiver 102. Specifically, the source element 212 remembers a last bitrate that is used for playback of a current/previous piece of content, and continues to use that bitrate for playback of the new content. As such, if the last bitrate is high, the source element 212 will start with the same high bitrate for the new content. If the new content cannot be playback at that bitrate, then the source element 212 will lower the bitrate. For example, if the downloading of the content takes less time than anticipated, there is spare bandwidth and the bitrate can be increased. Conversely, if the download is taking longer than anticipated, then the bitrate is decreased. As such, example embodiments, will start the playback of the new content at the previous/last bitrate instead of starting at a lower or lowest bitrate (and slowly increasing).

The demux demultiplexes the content data obtained from the CDN server 108 or the content provider 110 to obtain an audio signal and a video signal. The audio signal is transmitted to the audio decoder 216 for processing, while the video signal is transmitted to the video decoder 218 for processing. The results from the audio and video decoders 216 and 218 are output (e.g., transmitted) to the viewing device 104 for presentation to the user.

The cache manager 206 manages the prefetching of metadata for content that may potentially be selected for playback. In some embodiments, the cache manager 206 predicts content the user may be interested in viewing. For example, a user may be navigating a linear list of channels or programs (e.g., an electronic programming guide; "EPG") in a particular direction (e.g., up or down). In this embodiment, the cache manager 206 predicts a next set of content based on the direction of navigation on the linear list. In another example, the user may be viewing a video-on-demand (VoD) catalog or a watchlist of a user. If the user requests information or hovers over a selection for a piece of content, the cache manager 206 uses this as prediction that the piece of content is of interest to the user. Alternatively, the cache manager may consider all (or some) pieces of content in viewable portion of the catalog or watchlist as content of interest. In any of these cases, the cache manager 206 prefetches the metadata for the content of interest, and stores the prefetched data to the cache 208. The metadata may comprise, for example, one or more uniform resource locators (URLs) where the chunks of content are available, URLs for different bit rates, license data (e.g., where to obtain a license from), and codec information. The codec information will be used by the player 202 to determine whether to preserve at least a portion of the pipeline 204, as will be discussed further below. If the user subsequently selects content for which the metadata is already prefetched, then the metadata can be accessed from the cache 208 instead of having to be retrieved over the network 106 from the CDN server 108 or the content provider 110 after selection. This will assist in the reduction of latency in playback.

Any one or more of the components (e.g., modules, decoders, resources) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

Figure 3:
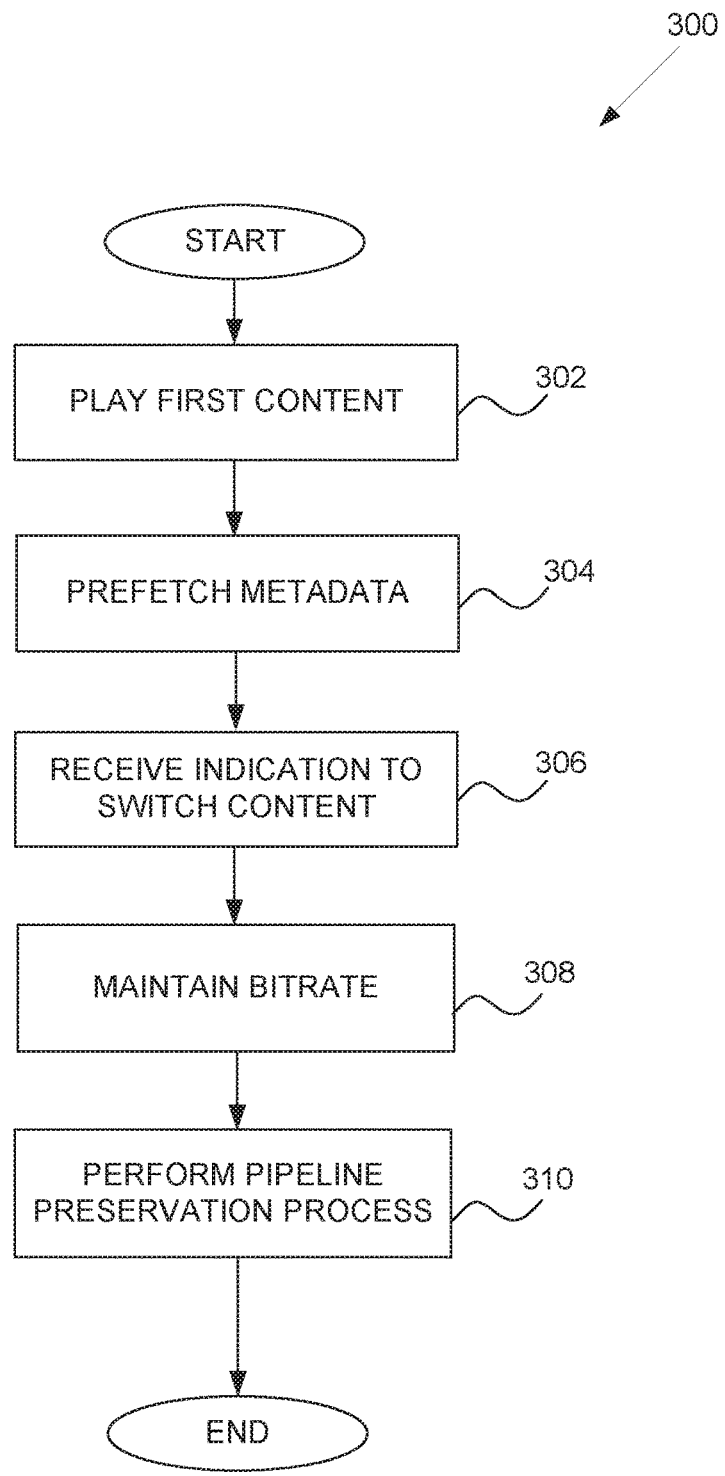
FIG. 3 is a flow diagram of a method for optimizing a content change process in accordance with example embodiments.

FIG. 3 is a flow diagram of an example method 300 for optimizing content change in accordance with example embodiments. In example embodiments, the method 300 is performed in part or in whole by components of the digital receiver 102. Accordingly, the method 300 is described by way of example with reference to the digital receiver 102. However, it shall be appreciated that at least some of the operations of the method 300 may be deployed on various other hardware configurations or be performed by similar components residing elsewhere in the environment 100. Therefore, the method 300 is not intended to be limited to the digital receiver 102.

In operation 302, a first piece of content is caused to be played by the viewing device 104. In example embodiments, the player 202 constructs the pipeline 204 for obtaining and processing the content data for the first piece of content. In particular, the player 202 acquires the source element 212, the demux 214, the audio decoder 216, and the video decoder 218 to form the pipeline 204. The data content is processed by the pipeline 204 and presented on the viewing device 104.

In operation 304, metadata for a set of one or more content of interest is prefetched. In example embodiments, the cache manager 206 predicts content of interest of a user and prefetches the metadata for the content of interest. The prefetched data is then stored to the cache 208. The metadata may comprise, but is not limited to, one or more URLs where the chunks of content are available, one or more URL for different bit rates, license data (e.g., where to obtain a license from), and codec information.

In operation 306, the player 202 receives an indication to switch to a new piece of content for playback. The indication may be received from a control device of the user (e.g., a remote controller). In some embodiments, the user may scroll through an EPG or be viewing a catalog or watchlist, and selects a new piece of content for viewing.

In operation 308, the digital receiver 102 maintains the bitrate when switching playback to the new piece of content. In example embodiments, when transitioning playback from an ongoing playback operation to a new playback operation, the source element 212 uses a heuristic bitrate derived for playback of the first piece of content for playback of the new piece of content. Thus, the source element 212 attempts to maintain or preserve the bitrate for playback as opposed to starting a new playback from the lowest possible bitrate. If the new piece of content cannot be delivered at that bitrate, then the source element 212 will lower the bitrate. As such, example embodiments, will start the download of the new content at the previous/last bitrate instead of starting at a lower or lowest bitrate (and slowly increasing). This allows playback of the new content at a most optimal bitrate instantly instead of having to heuristically re-compute the optimal bitrate starting from the lowest possible bitrate. Conventionally, the derivation of the optimal bitrate usually requires downloading several segments or chunks of content data resulting in a gradual improvement of picture quality. However, example embodiments that use the previous derived heuristic bitrate maintain the same level of image quality as that of the previous playback from a very beginning of playback for the new content.

In operation 310, a pipeline preservation process is performed to determine whether to maintain at least a portion of the pipeline used to playback the first piece of content for use with the playback of the new piece of content. Furthermore, if the pipeline is to be maintained or preserve, a determination is made as to whether all the resources of the pipeline should be preserved or only a portion of the pipeline preserved (e.g., only some of the resources are kept and others are released). The pipeline preservation process will be discussed in more detail in connection with FIG. 4.

Figure 4:
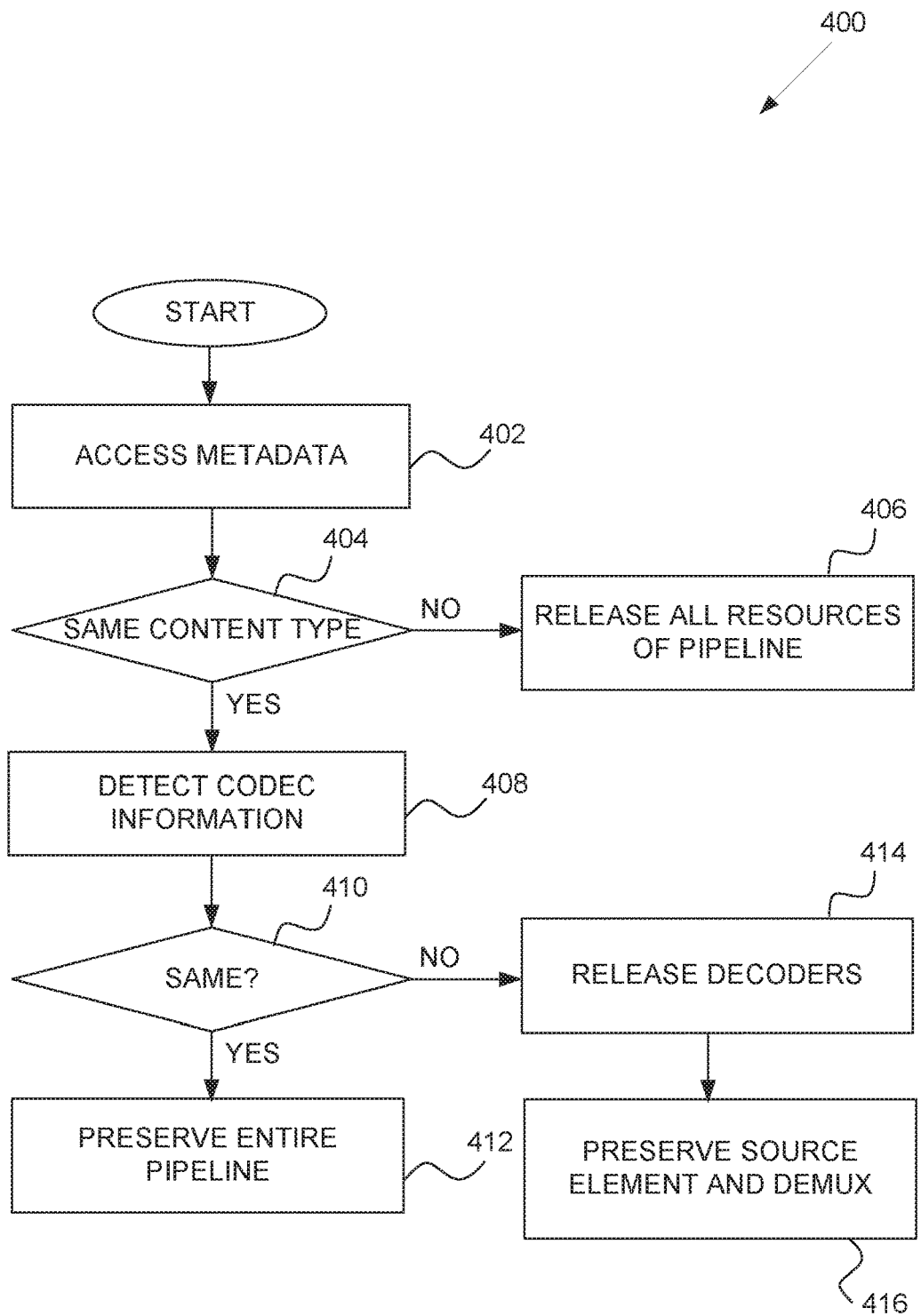
FIG. 4 is a flow diagram of a method for preserving a content delivery pipeline in accordance with example embodiments.

FIG. 4 is a flow diagram of an example method 400 for preserving a content delivery pipeline in accordance with example embodiments. In example embodiments, the method 400 is performed in part or in whole by the player 202 with respect the resources of the pipeline 204. Accordingly, the method 400 is described by way of example with reference to the player 202 and the pipeline 204. However, it shall be appreciated that at least some of the operations of the method 400 may be deployed on various other hardware configurations or be performed by similar components residing elsewhere in the environment 100. Therefore, the method 400 is not intended to be limited to the player 202 and the pipeline 204.

In operation 402, in response to receiving the indication to switch playback to new content, the cache manager 206 accesses the prefetched metadata stored in the cache 208 for the new content. The prefetched metadata for the new content may comprise one or more URLs where the new content is available, one or more URLs for different bit rates associated with the new content, license data for the new content, and codec information for the new content. The prefetched metadata may also indicate whether the new content is of a same type as the first piece of content. For example, the first piece of content and the new content may both be in a HTTP Live Streaming (HLS) format or both be in a Dynamic Adaptive Streaming over HTTP (DASH) format.

In operation 404, the player 202 determines whether the first piece of content and the new content are of the same content type. If the first piece of content and the new content are not of the same type (e.g., first piece of content is in HLS format and the new content is in DASH format), then the resources of the pipeline 204 (e.g., the source element 212, the demux 214, the audio decoder 216, and the video decoder 218) are released in operation 406. Releasing all the resources of the pipeline 204 essentially deconstructs the pipeline 204. The player 202 them creates a new pipeline by acquiring other resources that are applicable to the content type of the new content.

If in operation 404 the player 202 determines that the first piece of content and the new content are of the same content type (e.g., both are HLS format), then in operation 408, codec information is detected for the new content. In example embodiments, the player 202 examines the prefetched metadata for the new content for the codec information. The codec information indicates types of decoders needed for the new content.

In operation 410, a determination is made by the player 202 as to whether the types of decoders needed for the new content is the same as the decoders currently in the pipeline 204 for the first piece of content. If the types of decoders needed is the same, then in operation 412 the entire pipeline 204 is preserved. In other words, the resources of the pipeline 204 are maintained and continued to be used to playback the new content.

However, if in operation 410 the player 202 determines that the new content needs different decoders, then in operation 414, the decoders (e.g., the audio decoder 216 and the video decoder 208) are released. Subsequently in operation 416, a remaining portion of the pipeline 204 (e.g., the source element 212 and the demux 214) are preserved or maintained. In these embodiments, the player 202 acquires a new set of decoders (e.g., a new audio decoder and a new video decoder) applicable to the new content, and adds the new set of decoders to the preserved portion of the pipeline 204.

While example embodiments are discussed with respect to pipeline and bitrate preservation applicable to both DASH and HLS, example embodiments for preservation of bitrate and the pipeline is applicable for any type of content that is adaptive in nature (e.g., where the content bitrate can change based on bandwidth).

Figure 5:
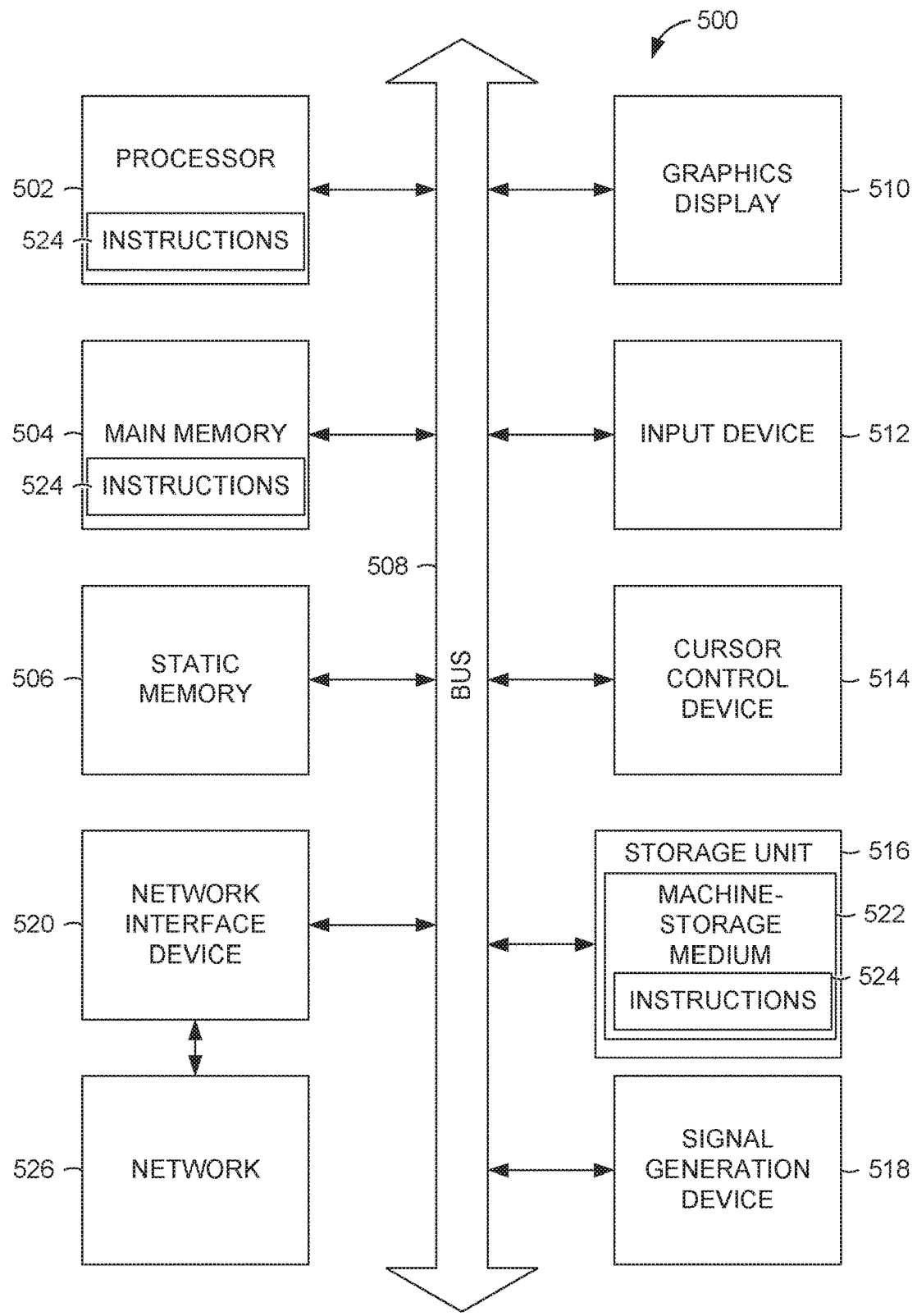
FIG. 5 is a diagrammatic representation of a machine in an example form of a computing system within which a set of instructions may be executed for causing the machine to perform any one or more of the methodologies discussed herein, according to an example embodiment.

FIG. 5 is a block diagram illustrating components of a machine 500, according to some example embodiments, able to read instructions 524 from a machine-storage medium 522 (e.g., a non-transitory machine-storage medium, a machine-readable storage medium, a computer-readable storage medium, or any suitable combination thereof) and perform any one or more of the methodologies discussed herein, in whole or in part. Specifically, FIG. 5 shows the machine 500 in the example form of a computer device (e.g., a computer) within which the instructions 524 (e.g., software, a program, an application, an applet, an app, or other executable code) for causing the machine 500 to perform any one or more of the methodologies discussed herein may be executed, in whole or in part.

For example, the instructions 524 may cause the machine 500 to execute the flow diagrams of FIGS. 3 and 4. The instructions 524 can transform the general, non-programmed machine 500 into a particular machine (e.g., specially configured machine) programmed to carry out the described and illustrated functions in the manner described.

In alternative embodiments, the machine 500 operates as a standalone device or may be connected (e.g., networked) to other machines. The machine 500 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 500 capable of executing the instructions 524, sequentially or otherwise, that specify actions to be taken by that machine 500. Further, while only a single machine 500 is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The processor 502 may contain microcircuits that are configurable, temporarily or permanently, by some or all of the instructions 524 such that the processor 502 is configurable to perform any one or more of the methodologies described herein, in whole or in part. For example, a set of one or more microcircuits of the processor 502 may be configurable to execute one or more modules (e.g., software modules) described herein.

The machine 500 may further include a graphics display 510 (e.g., a plasma display panel (PDP), a light emitting diode (LED) display, a liquid crystal display (LCD), a projector, a cathode ray tube (CRT), or any other display capable of displaying graphics or video). The machine 500 may also include an alphanumeric input device 512 (e.g., a keyboard or keypad), a cursor control device 514 (e.g., a mouse, a touchpad, a trackball, a joystick, a motion sensor, an eye tracking device, or other pointing instrument), a storage unit 516, a signal generation device 518 (e.g., a sound card, an amplifier, a speaker, a headphone jack, or any suitable combination thereof), and a network interface device 520.

The storage unit 516 includes the machine-storage medium 522 (e.g., a tangible machine-readable storage medium) on which are stored the instructions 524 embodying any one or more of the methodologies or functions described herein. The instructions 524 may also reside, completely or at least partially, within the main memory 504, within the processor 502 (e.g., within the processor's cache memory), or both, before or during execution thereof by the machine 500. Accordingly, the main memory 504 and the processor 502 may be considered machine-storage media 522 (e.g., tangible and non-transitory machine-storage media).

In some example embodiments, the machine 500 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor. Inputs harvested by any one or more of these input components may be accessible and available for use by any of the modules described herein.

Executable Instructions and Machine-Storage Medium

The various memories (i.e., 504, 506, and/or memory of the processor(s) 502) and/or storage unit 516 may store one or more sets of instructions and data structures (e.g., software) 524 embodying or utilized by any one or more of the methodologies or functions described herein. These instructions, when executed by processor(s) 502 cause various operations to implement the disclosed embodiments.

As used herein, the terms "machine-storage medium," "device-storage medium," "computer-storage medium" (referred to collectively as "machine-storage medium 522") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 522 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 522 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 524 may further be transmitted or received over a communications network 526 using a transmission medium via the network interface device 520 and utilizing any one of a number of well-known transfer protocols (e.g., HTTP). Examples of communication networks 526 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 524 for execution by the machine 500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium 522 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 502 or a group of processors 502) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

EXAMPLES

Example 1 is a method for optimizing a content change process. The method comprises causing playback, by a digital receiver, of a first piece of content; receiving, by the digital receiver, a selection of a new piece of content for playback during the playback of the first piece of content; and in response to the receiving of the selection, maintaining, by a processor of the digital receiver, a bitrate used for playback of the first piece of content to initiate playback of the new piece of content.

In example 2, the subject matter of example 1 can optionally include determining whether the new piece of content is of a same type as the first piece of content; and based on the new piece of content being the same type as the first piece of content, determining whether to preserve at least a portion of a playback pipeline.

In example 3, the subject matter of examples 1-2 can optionally include wherein the determining whether to preserve comprises detecting codec information for the new piece of content, the codec information indicating types of decoders needed for the new content; and determining whether an audio decoder and a video decoder in the pipeline are of the types indicated by the codec information.

In example 4, the subject matter of examples 1-3 can optionally include preserving the entire pipeline in response to the audio decoder and the video decoder in the pipeline being the types indicated by the codec information.

In example 5, the subject matter of examples 1-4 can optionally include releasing the audio decoder and the video decoder in the pipeline in response to the audio decoder and the video decoder in the pipeline being different than the types indicated by the codec information; and obtaining a new audio decoder and a new video decoder based on the codec information.

Example 6 is a system optimizing a content change process. The system includes one or more hardware processors and a storage device storing instructions that configure the one or more hardware processors to perform operations comprising causing playback of a first piece of content; receiving a selection of a new piece of content for playback during the playback of the first piece of content; and in response to the receiving of the selection, maintaining a bitrate used for playback of the first piece of content to initiate playback of the new piece of content.

In example 7, the subject matter of example 6 can optionally include determining whether the new piece of content is of a same type as the first piece of content; and based on the new piece of content being the same type as the first piece of content, determining whether to preserve at least a portion of a playback pipeline.

In example 8, the subject matter of examples 6-7 can optionally include wherein the determining whether to preserve comprises detecting codec information for the new piece of content, the codec information indicating types of decoders needed for the new content; and determining whether an audio decoder and a video decoder in the pipeline are of the types indicated by the codec information.

In example 9, the subject matter of examples 6-8 can optionally include preserving the entire pipeline in response to the audio decoder and the video decoder in the pipeline being the types indicated by the codec information.

In example 10, the subject matter of examples 6-9 can optionally include releasing the audio decoder and the video decoder in the pipeline in response to the audio decoder and the video decoder in the pipeline being different than the types indicated by the codec information; and obtaining a new audio decoder and a new video decoder based on the codec information.

Example 11 is machine-readable medium storing instructions that when executed by one or more hardware processors of a machine, cause the machine to perform operations comprising causing playback of a first piece of content; receiving a selection of a new piece of content for playback during the playback of the first piece of content; and in response to the receiving of the selection, maintaining a bitrate used for playback of the first piece of content to initiate playback of the new piece of content.

In example 12, the subject matter of example 11 can optionally include determining whether the new piece of content is of a same type as the first piece of content; and based on the new piece of content being the same type as the first piece of content, determining whether to preserve at least a portion of a playback pipeline.

In example 13, the subject matter of examples 11-12 can optionally include wherein the determining whether to preserve comprises detecting codec information for the new piece of content, the codec information indicating types of decoders needed for the new content; and determining whether an audio decoder and a video decoder in the pipeline are of the types indicated by the codec information.

In example 14, the subject matter of examples 11-13 can optionally include preserving the entire pipeline in response to the audio decoder and the video decoder in the pipeline being the types indicated by the codec information.

In example 15, the subject matter of examples 11-14 can optionally include releasing the audio decoder and the video decoder in the pipeline in response to the audio decoder and the video decoder in the pipeline being different than the types indicated by the codec information; and obtaining a new audio decoder and a new video decoder based on the codec information.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   causing playback, by a digital receiver, of a first piece of content at a first bitrate, the first bitrate being a bitrate adapted for playback of the first piece of content;
   receiving, by the digital receiver, a selection of a new piece of content for playback during the playback of the first piece of content;
   in response to the receiving of the selection, transitioning from ongoing playback of the first piece of content to the new piece of content by initiating playback of the new piece of content using the first bitrate used for playback of the first piece of content;
   during playback of the new piece of content using the first bitrate, detecting whether the new piece of content can maintain playback at the first bitrate; and
   in response to the detecting that the new piece of content cannot continue playback at the first bitrate, adjusting the first bitrate.

2. The method of claim 1, further comprising:
   determining whether the new piece of content is of a same content type as the first piece of content; and
   based on the new piece of content being the same content type as the first piece of content, determining whether to preserve at least a portion of a playback pipeline used to play back the first piece of content, the preserving of at least the portion of the playback pipeline comprising preserving one or more of a source element, a demultiplexer, an audio decoder, or a video decoder.

3. The method of claim 2, wherein the determining whether to preserve comprises:
   detecting codec information for the new piece of content, the codec information indicating types of decoders needed for the new piece of content; and
   determining whether the audio decoder and the video decoder in the playback pipeline are of the types indicated by the codec information.

4. The method of claim 3, further comprising preserving the entire playback pipeline in response to the audio decoder and the video decoder in the playback pipeline being the types indicated by the codec information.

5. The method of claim 3, further comprising:
   releasing the audio decoder and the video decoder in the playback pipeline in response to the audio decoder and the video decoder in the playback pipeline being different than the types indicated by the codec information; and
   obtaining a new audio decoder and a new video decoder based on the codec information.

6. A system comprising:
   one or more hardware processors; and
   a storage device storing instructions that configure the one or more hardware processors to perform operations comprising:
      causing playback, by a digital receiver, of a first piece of content at a first bitrate, the first bitrate being a bitrate adapted for playback of the first piece of content;
      receiving, by the digital receiver, a selection of a new piece of content for playback during the playback of the first piece of content;
      in response to the receiving of the selection, transitioning from ongoing playback of the first piece of content to the new piece of content by initiating playback of the new piece of content using the first bitrate used for playback of the first piece of content;
      during playback of the new piece of content using the first bitrate, detecting whether the new piece of content can maintain playback at the first bitrate; and
      in response to the detecting that the new piece of content cannot continue playback at the first bitrate, adjusting the first bitrate.

7. The system of claim 6, wherein the operations further comprise:
   determining whether the new piece of content is of a same content type as the first piece of content; and
   based on the new piece of content being the same content type as the first piece of content, determining whether to preserve at least a portion of a playback pipeline used to play back the first piece of content, the preserving of at least the portion of the playback pipeline comprising preserving one or more of a source element, a demultiplexer, an audio decoder, or a video decoder.

8. The system of claim 7, wherein the determining whether to preserve comprises:
   detecting codec information for the new piece of content, the codec information indicating types of decoders needed for the new piece of content;
   determining whether the audio decoder and the video decoder in the playback pipeline are of the types indicated by the codec information.

9. The system of claim 8, wherein the operations further comprise preserving the entire playback pipeline in response to the audio decoder and the video decoder in the playback pipeline being the types indicated by the codec information.

10. The system of claim 8, wherein the operations further comprise:
    releasing the audio decoder and the video decoder in the playback pipeline in response to the audio decoder and the video decoder in the playback pipeline being different than the types indicated by the codec information; and
    obtaining a new audio decoder and a new video decoder based on the codec information.

11. A machine storage medium storing instructions that when executed by one or more hardware processors of a machine, cause the machine to perform operations comprising:
    causing playback, by a digital receiver, of a first piece of content, the first bitrate being a bitrate adapted for playback of the first piece of content;
    receiving, by the digital receiver, a selection of a new piece of content for playback during the playback of the first piece of content; and
    in response to the receiving of the selection, transitioning from ongoing playback of the first piece of content to the new piece of content by initiating playback of the new piece of content using the first bitrate used for playback of the first piece of content;
    during playback of the new piece of content using the first bitrate, detecting whether the new piece of content can maintain playback at the first bitrate; and
    in response to the detecting that the new piece of content cannot continue playback at the first bitrate, adjusting the first bitrate.

12. The machine storage medium of claim 11, wherein the operations further comprise:
    determining whether the new piece of content is of a same content type as the first piece of content; and
    based on the new piece of content being the same content type as the first piece of content, determining whether to preserve at least a portion of a playback pipeline used to playback the first piece of content, the preserving of at least the portion of the playback pipeline comprising preserving one or more of a source element, a demultiplexer, an audio decoder, or a video decoder.

13. The machine storage medium of claim 12, wherein the determining whether to preserve comprises:
    detecting codec information for the new piece of content, the codec information indicating types of decoders needed for the new piece of content; and
    determining whether the audio decoder and the video decoder in the playback pipeline are of the types indicated by the codec information.

14. The machine storage medium of claim 13, wherein the operations further comprise preserving the entire playback pipeline in response to the audio decoder and the video decoder in the playback pipeline being the types indicated by the codec information.

15. The machine storage medium of claim 13, wherein the operations further comprise:

releasing the audio decoder and the video decoder in the playback pipeline in response to the audio decoder and the video decoder in the playback pipeline being different than the types indicated by the codec information; and obtaining a new audio decoder and a new video decoder based on the codec information.

16. The method of claim 1, wherein:

the detecting whether the new piece of content can maintain playback at the first bitrate comprises determining that download of the new piece of content is taking less time than anticipated; and the adjusting comprises increasing the first bitrate.

17. The method of claim 1, wherein:

the detecting whether the new piece of content can maintain playback at the first bitrate comprises determining that download of the new piece of content is taking longer than anticipated; and the adjusting comprises decreasing the first bitrate.

18. The system of claim 6, wherein:

the detecting whether the new piece of content can maintain playback at the first bitrate comprises determining that download of the new piece of content is taking less time than anticipated; and the adjusting comprises increasing the first bitrate.

19. The system of claim 6, wherein:

the detecting whether the new piece of content can maintain playback at the first bitrate comprises determining that download is taking longer than anticipated; and the adjusting comprises decreasing the first bitrate.

20. The machine storage medium of claim 11 wherein:

the detecting whether the new piece of content can maintain playback at the first bitrate comprises determining that download of the new piece of content is taking less time than anticipated and the adjusting comprises increasing the first bitrate; or the detecting whether the new piece of content can maintain playback at the first bitrate comprises determining that download is taking longer than anticipated and the adjusting comprises decreasing the first bitrate.

\* \* \* \* \*